Sept. 24, 1957 H. K. J. STROSCHE 2,807,762

METHOD OF PRODUCING SELENIUM RECTIFIERS

Filed March 2, 1954

INVENTOR
H. K.J. STROSCHE

BY Philip M. Bolton
ATTORNEY

United States Patent Office 2,807,762 Patented Sept. 24, 1957

2,807,762

METHOD OF PRODUCING SELENIUM RECTIFIERS

Hermann K. J. Strosche, Nurnberg, Germany, assignor to International Standard Electric Corporation, New York, N. Y., a corporation of Delaware Application March 2, 1954, Serial No. 413,661

Claims priority, application Germany March 6, 1953

4 Claims. (Cl. 317—241)

The present invention relates to selenium rectifiers and a method of making the same.

As is well known, selenium rectifiers consist of a metallic base plate on which a layer of selenium is deposited. On this layer of selenium there is arranged a layer of metal known as the counter-electrode. With regard to such rectifiers it is desirable that no barrier-layer is formed between the base plate and the selenium, whereas the formation of a barrier-layer between the selenium and the counter electrode is necessary. Such a building-up process can be improved by the employment of various arrangements. Thus it is attempted, for instance, by the insertion of different intermediate layers between the base plate and the selenium, to prevent the formation of a barrier-layer at this point, whereas on the other hand the surface of the selenium is treated, or insulating substances are deposited as a thin layer, in order to obtain a particularly good barrier-layer at this point. Further it is known that the rectifying effect which is closely connected with the formation of a barrier layer, largely depends on the kind and the composition of the counter-electrode. The barrier-layer will be strongly affected by a reaction between the selenium and the material of the counter-electrode. As metal for the counter electrode hitherto various metals and alloys were employed, such alloys containing cadmium in different quantities.

With regard to the conventional types of selenium rectifiers comprising a cadmium-containing counter-electrode, the current-voltage characteristic of the rectifier exhibits a typical path. It first of all proceeds along near the voltage axis, then bends off steeply upwards when reaching a certain predetermined value of the voltage. This voltage is generally known as the threshold voltage. The value for the said threshold voltage may be obtained by extending the straight-lined part of the characteristic to the intersecting point of the voltage axis.

In these common selenium rectifiers with the cadmium-containing counter-electrode the threshold voltage amounts to about 0.5 volt.

An object of the present invention is to provide a method of making selenium rectifiers, in which the threshold voltage is substantially reduced in relation to the above value.

Of course, it is known that the threshold voltage of selenium rectifiers can be reduced by employing certain metals for the counter-electrode. In particular those counter-electrode metals are suitable to this end which have a high work function of electron emissivity. A reduction of the threshold voltage will be obtained, for instance, when using bismuth, tin, lead, antimony or nickel as counter-electrode material. The so-constructed rectifier plates, however, have the great disadvantage of permitting formation either not at all or only very badly. Besides this the threshold voltage will be increased again after formation, thus annulling the effect of the previously achieved advantage.

The present invention serves to overcome the aforesaid drawbacks, and it will be possible according to the inventive method to produce selenium rectifier plates having a considerably reduced threshold voltage and, consequently, a substantially improved current-voltage characteristic, and which are suitable for the formation process and which maintain the low value of the threshold voltage also after the formation process.

In accordance with the invention, selenium rectifiers of this kind are manufactured by depositing onto the selenium layer, which is applied to the base plate, an extremely thin layer of metal having a large work function of electrons. This will be performed prior to the deposit of the counter-electrode.

As suitable metals to be employed for the thin intermediate layer those are perferred which produce a low threshold voltage when employed as metals for the counter electrode. These are, in particular, the metals of the fourth and fifth group of the periodic system of the elements. Bismuth has proved to be particularly well adapted to the purpose. It is, however, also possible to use thin layers of tin, lead, antimony or nickel. Onto these thin layers of metal there will be deposited in the conventional manner the usual counter-electrode metal. For example, a cadmium-containing alloy, e. g. the bismuth-tin-cadmium eutectic, containing 53% by weight bismuth, 26% tin and 21% cadmium or an alloy of 68% tin and 32% cadmium, will be deposited by way of spraying.

It is, of course, already known to build-up the counter electrode of selenium rectifiers out of two or more different layers of metal, but the aim which is achieved by the present invention, i. e. the reduction of the threshold voltage while simultaneously maintaining the capability of formation, could not be attained hitherto. The cause of this is that the layers of metal, which were applied to the selenium, were too thick. Of material importance to the intermediate layer of metal applied to the selenium in the inventive manner is that the layer be extremely thin. The invention prescribes that the quantity of metal for the intermediate layer may not exceed $5 \times 10^{-7}$ g./cm.$^2$, in order to achieve the desired effect. Despite the already mentioned fact that, when using the threshold-voltage-reducing-metals as counter-electrode, the resulting rectifier plates are either incapable or only to very slight voltages capable of formation, it has been found, surprisingly, that the rectifier plates can be subjected to the formation without causing an increase of the threshold voltage when employing extremely thin layers of metal. Since such thin layers of metal themselves cannot be used as counter electrodes, a thicker layer of metal will be deposited onto the first one for acting as the electrode. In this respect it is surprising to note that the composition of the thick layer of metal has no detrimental effect upon the advantages achieved by the thin intermediate layer. Therefore, the usual counter electrode alloy can be used for this purpose.

The thin intermediate layers of metal can be applied in various manners, but vaporization in a vacuum has proved to be particularly advantageous. In order to obtain an exact amount of such small quantities it is preferred to use, for example, a rotating diaphragm between the vaporizer and the layer of selenium to be provided with the vaporization product, so that the stream of vapor is only permitted to momentarily approach the surface of the selenium layer. This will prevent the building up of too thick an intermediate layer, which might otherwise occur during the time between the heating up of the vaporizer and its reaching the vaporization temperature. When depositing, for instance, a thin intermediate layer of bismuth on the layer of selenium of a rectifier plate in the manner described hereinbefore and with the stated quantity, and when spraying onto this layer a counter electrode of bismuth, tin and cadmium, there will result rectifier plates in which the threshold voltage is reduced to 0.2–0.35 volt and which, at the same time, are capable of being formed to a barrier voltage of approximately 20 volts, which could not be reached till now with rectifier plates having a reduced threshold voltage. By the present invention the current-voltage characteristic is shifted producing a considerably improved rectifier. In order to fully utilize the advantage of the improved characteristic it is appropriate to load the rectifier plates as high as possible, and to keep the temperature of the rectifier, in the conventional manner by means of an artificial cooling, preferably at about 40° C.

The invention will be particularly described with reference to the figures of the accompanying drawing.

Figure 1:
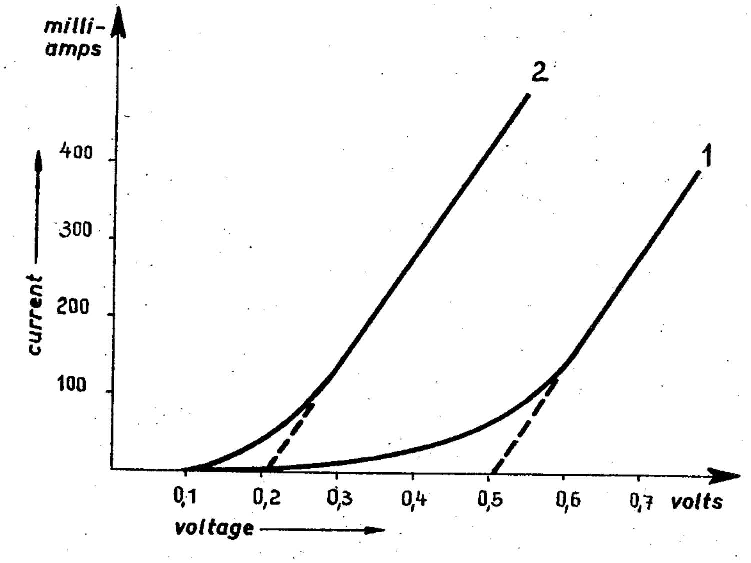
Fig. 1 shows two rectifier current-voltage characteristics in order to demonstrate the improvement of the characteristic caused by the present invention.

Fig. 1 shows the dependence of the forward current (ordinate) on the voltage in the forward direction (abscissa). Curve 1 shows the conditions with regard to a conventional rectifier plate without an intermediate layer. Curve 2 shows a part of the characteristic of a rectifier according to the present invention, onto which an extremely thin intermediate layer of bismuth had been deposited prior to the application of the counter electrode to the layer of selenium. From Fig. 1 it may be seen that the two curves first of all follow the course of the abscissa, then to bend off more or less steeply upwards and finally change over to a straight-line part, which is parallel for both of the curves. When extending the straight-line part of the curvature to the intersecting point with the abscissa, as denoted in Fig. 1 by dashlines, the values for the threshold voltage is obtained on the abscissa. With regard to curve 1 (without intermediate layer) the threshold voltage amounts to 0.5 volt, and with regard to curve 2 (with intermediate layer) the threshold voltage amounts to 0.2 volt. Furthermore it may be seen that in the case of the rectifier, corresponding to curve 2 relatively large currents flow at much smaller voltage values.

Figure 2:
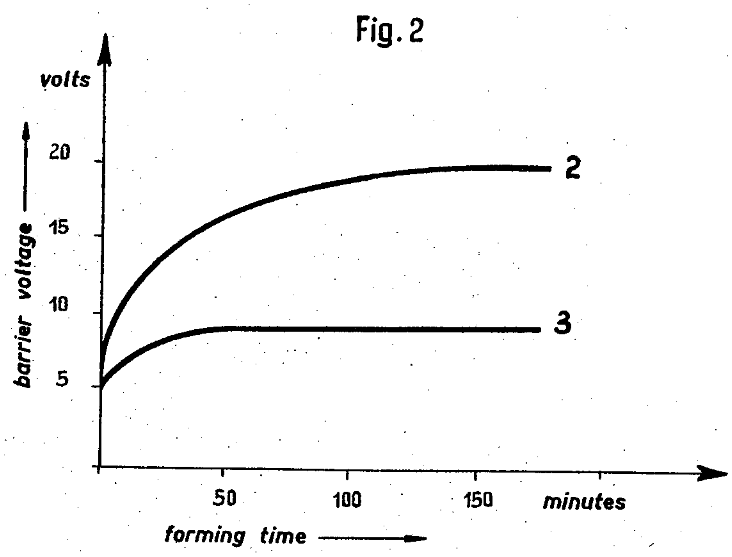
Fig. 2 shows with reference to two curves, the improvement in the forming process.

Fig. 2 shows the formation curvatures of two different rectifier plates. The curves show the relationship of the obtained formation voltage (ordinate) to the time of formation. Curve 2 again corresponds to a rectifier plate constructed according to the invention and which is provided with an intermediate layer of bismuth of about $10^{-7}$ g./cm.$^2$, whereas curve 3 refers to a rectifier plate whose counter electrode entirely consists of a compact layer of bismuth. From these it may be easily seen that with regard to the rectifier plate comprising the compact layer of bismuth (curve 3), it was possible at the utmost to obtain a barrier voltage of about 9 volts. In contrast thereto curve 2 rises up to 20 volts. From this it is clearly to be seen that it not only depends on the metal adjoining the selenium, but that the proper dosage plays a very important part.

As has been already pointed out hereinbefore, the invention is not only limited to the application of vaporized intermediate layers of bismuth, but that every other suitable metal having a high work function of electron emissivity can be successfully employed for producing this intermediate layer. Furthermore it is also possible to employ other methods of application as long as the thickness of the intermediate layer is kept below $5 \times 10^{-7}$ g./cm.$^2$.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In the method of manufacturing selenium rectifiers the step comprising applying a thin intermediate metallic layer to the selenium consisting of a metal having a large work function and in which layer said metal does not exceed $5 \times 10^{-7}$ g./cm.$^2$, before applying the counter electrode on top of said thin intermediate layer.

2. A method according to claim 1 wherein said metal of the intermediate layer is one selected from the group consisting of bismuth, tin, lead, antimony and nickel.

3. In the method of manufacturing selenium rectifiers the steps comprising producing a thin intermediate metallic layer between the counter electrode and the selenium layer, deposited from a metal selected from the class including bismuth, tin, lead, antimony and nickel, in which the material of said intermediate layer is equal to or less than $5 \times 10^{-7}$ g./cm.$^2$.

4. In a selenium rectifier having a base plate, and a layer of selenium on the base plate, a thin intermediate layer consisting of a metal selected from the group including bismuth, tin, lead, antimony and nickel and not exceeding $5 \times 10^{-7}$ g./cm.$^2$, and a counter electrode on said thin intermediate layer.

References Cited in the file of this patent

UNITED STATES PATENTS

| | | |
|---|---|---|
| 2,437,336 | Thompson et al. | Mar. 9, 1948 |
| 2,652,522 | Vanderhoff | Sept. 15, 1953 |
| 2,669,663 | Pankove | Feb. 16, 1954 |